June 12, 1962          J. COVIELLO          3,038,514
TIRE CHAIN
Filed May 11, 1961
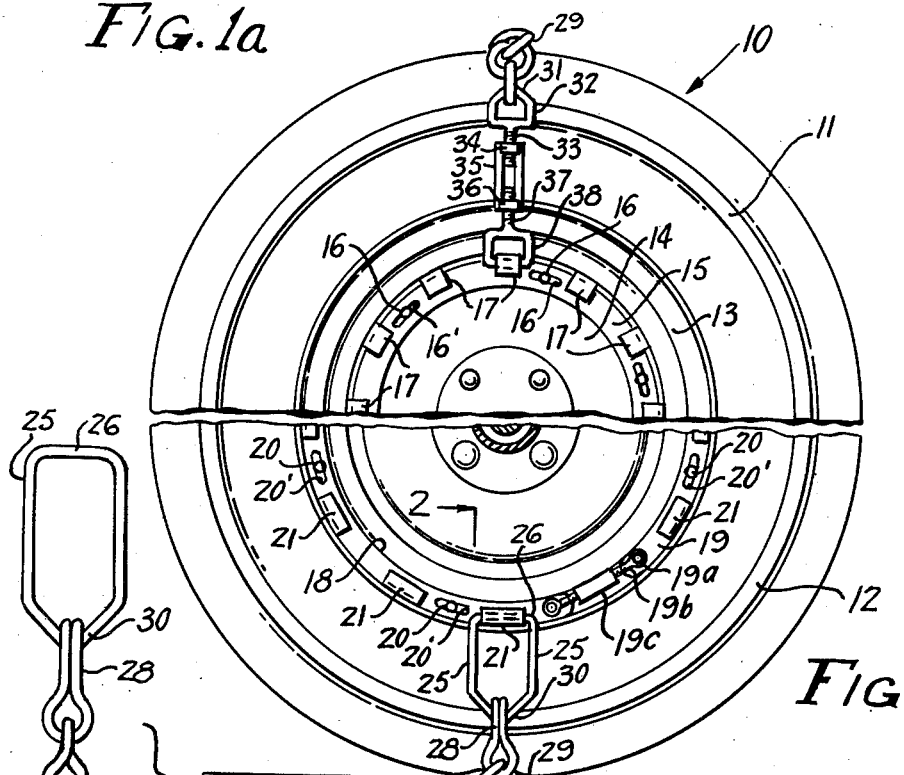
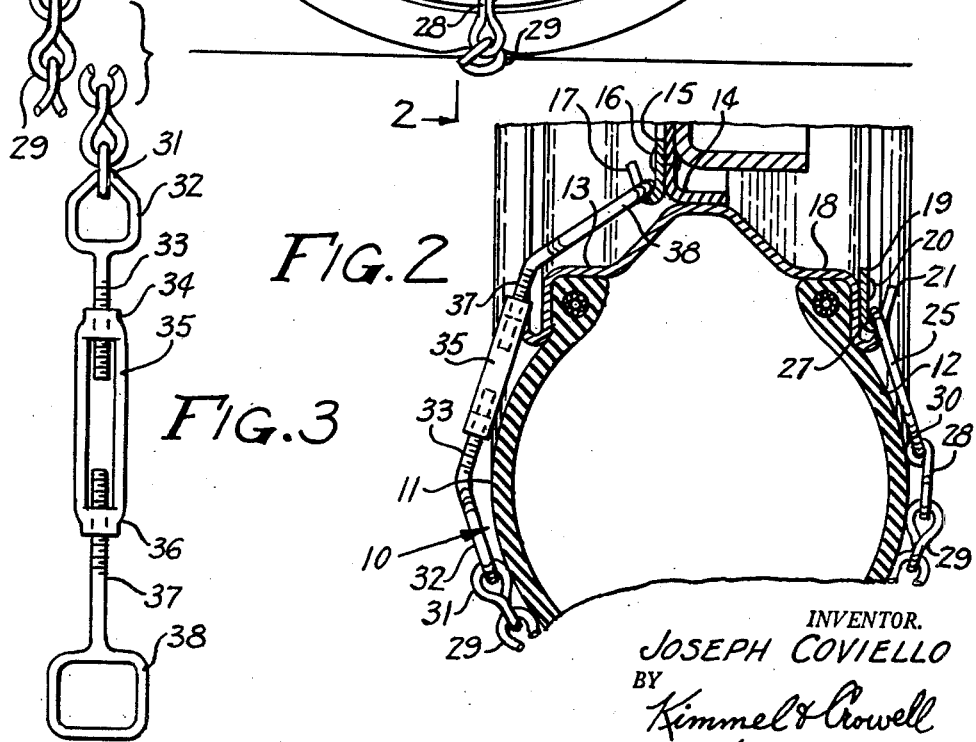
INVENTOR.
JOSEPH COVIELLO
BY
Kimmel & Crowell
ATTORNEYS.

3,038,514
TIRE CHAIN
Joseph Coviello, 112 S. Chestnut St., Beacon, N.Y.
Filed May 11, 1961, Ser. No. 109,391
1 Claim. (Cl. 152—233)

This invention relates to a tire chain, and more particularly to such a chain adapted to be applied to the individual wheels of a motor vehicle or the like.

A primary object of this invention is the provision of a link chain which may be attached to or detached from a vehicle wheel with a minimum of effort and difficulty.

An additional object of the invention is the provision of a tire chain which may be readily adapted to a variety of sizes of wheels and/or tires.

Still another object of the invention is the provision of a tire chain of this character provided with an integral turnbuckle whereby the same may be tightened or loosened as desired, or be adjusted to engage about various sizes of tires.

A further object of the invention resides in the provision of supplemental rims adapted to be added to the conventional rim on both the inside and outside of a vehicle wheel, the supplemental rims being provided with reverted portions forming hooks, in order to facilitate the attachment of the individual chains thereto.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1a is a side elevational view showing the upper section of the front or outside of a vehicle wheel having the tire chain of the instant invention and its securing rims applied thereto.

FIGURE 1b is a side elevational view showing the lower section of the rear or inside of a vehicle wheel having the tire chain of the instant invention and its securing rims affixed thereto.

FIGURE 2 is an enlarged sectional view taken substantially along the line 2—2 of FIG. 1b as viewed in the direction indicated by the arrows, parts thereof being broken away; and FIGURE 3 is a plan view, partially broken away, of the tire chain per se disassociated from a wheel.

Similar reference characters refer to similar parts throughout the several views of the drawings.

Having reference now to the drawings in detail, there is generally indicated at 10 a vehicle wheel which includes a front or outer side 11 and a rear or inner side 12. The front side, as shown in FIG. 1a includes the conventional rim 13 and hub 14, there being a supplemental annular rim generally indicated at 15 secured as by bolts 16 to the hub 14. The rim 15 is provided with a plurality of spaced apart reverted lugs 17, which form hooks, the purpose of which will be more fully described hereinafter.

Similarly, the rear of the tire, as shown in FIG. 1b includes an annulus or rim 18, to which is applied a supplemental rim 19 which is bolted in position as by means of bolts 20. Similar reverted portions 21 are upstruck and form hooks for the engagement of a tire chain to be more fully described hereinafter. In order to accommodate different sizes of wheels rim 19 may be split and have studs 19a at its extremities over which fit the eyes of eye bolts 19b, which are connected by a turnbuckle 19c. In this case the bolts 20 are extended through slots 20'. Supplemental rim 15 may be provided with a similar turnbuckle arrangement if desired.

The chain of the instant invention includes an eye 25 having a relatively straight bight 26, which includes a slightly inwardly turned end portion 27 (see FIG. 2), the eye 25 being adapted to engage as best shown in FIGS. 1b and 2 over one of the hooks or lugs 21.

An end link 28 of an elongated chain 29 is fixedly secured to a link 25 of a V-shaped end portion 30. The other end of the chain includes an end loop 31 (see FIG. 3) which is secured to an eye 32 formed at one end of a threaded bolt member 33.

Bolt member 33 engages one interiorly threaded end portion 34 of a conventional turnbuckle 35, the other internally threaded end 36 of which engages an angularly disposed portion 37 of a second bolt member which is provided with an eye 38. The eye 38 as best shown in FIGS. 1a and 2 engages over a selected one of the hooks 17.

In the use and operation of the device the bight 26 of eye 25 is positioned over a tire and engaged with one of the rear or inside hooks 21. The chain is then extended over the tire until the eye 38 engages in aligned opposite hook 17. At this time the turnbuckle 35 is tightened to draw the bolts 33 and 37 towards each other until the chain is firmly fitted about the outside of the wheel. When it is desired to remove the chain, the turnbuckle may be rotated in the opposite direction to position the bolts 33 and 37 farther apart so that the device may be readily disengaged from its associated hooks.

Obviously, as many chains as necessary or desired, all being substantially identical, may be added to the wheel.

From the foregoing it will now be seen that there is herein provided an improved tire chain, which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

In a vehicle wheel having hub and rim portions the combination comprising a first supplemental rim fixed to the rim portion on one side of said wheel, a second supplemental rim of lesser diameter than said first fixed to the hub portion on the opposite side of said wheel, a plurality of circumferentially spaced radially inwardly extending hooks on each of said supplemental rims, chains each having an eye at one end thereof, said eyes engageable over the hooks on said first supplemental rim, turnbuckles secured to the other end of each of said chains, said turnbuckles each including an elongated rotatable buckle having a threaded bore in each end thereof, threaded screws engaged in each of said bores at one end and each having an eye at its free end, the eye of one of said screws secured to the free end of each of said chains, the eye of the other of said screws engageable over the hooks on said second supplemental rim, and the threaded screws of said turnbuckles angularly offset intermediate their ends.

References Cited in the file of this patent

UNITED STATES PATENTS

| | | |
|---|---|---|
| 891,030 | Bekefi | June 30, 1908 |
| 1,547,078 | Stuart | July 21, 1925 |
| 1,643,167 | Miley | Sept. 20, 1927 |
| 1,797,230 | Gillet | Mar. 24, 1931 |
| 2,474,521 | Fogarty | June 28, 1949 |
| 2,507,037 | Miller | May 9, 1950 |
| 2,751,958 | Weddington | June 26, 1956 |